United States Patent
Song et al.

(10) Patent No.: US 10,848,595 B2
(45) Date of Patent: Nov. 24, 2020

(54) METHOD AND DEVICE FOR MESSAGE SENDING AND RECEIVING BASED ON A COMMUNICATION INTERFACE FRAMEWORK

(71) Applicant: ALIBABA GROUP HOLDING LIMITED, Grand Cayman (KY)

(72) Inventors: Zhuo Song, Beijing (CN); Yu Li, Beijing (CN); Zhiping He, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 493 days.

(21) Appl. No.: 15/461,257

(22) Filed: Mar. 16, 2017

(65) Prior Publication Data
US 2017/0272540 A1    Sep. 21, 2017

(30) Foreign Application Priority Data
Mar. 17, 2016    (CN) .......................... 2016 1 0154122

(51) Int. Cl.
*H04L 29/06*    (2006.01)
*H04L 29/08*    (2006.01)
(Continued)

(52) U.S. Cl.
CPC ........ *H04L 67/325* (2013.01); *G06F 9/45558* (2013.01); *G06F 9/545* (2013.01);
(Continued)

(58) Field of Classification Search
CPC ..... H04L 69/16; H04L 69/161; H04L 69/163; H04L 63/0421; G06F 11/141;
(Continued)

(56) References Cited

U.S. PATENT DOCUMENTS 7,200,704 B2 * 4/2007 Njoku .................. G06F 13/102
709/238
7,395,310 B1 * 7/2008 Sikora ................. H04Q 3/0045
701/86
(Continued)

FOREIGN PATENT DOCUMENTS

CN    1441366 A    9/2003
CN    1489358 A    4/2004
(Continued)

OTHER PUBLICATIONS

Extended European Search Report pursuant to Rule 62 EPC, the Supplementary European Search Report (Art. 153(7) EPC) and the European Search Opinion issued in EPO Application No. 17767558.4 dated Feb. 15, 2019 (6 pages).
(Continued)

*Primary Examiner* — Chirag R Patel
(74) *Attorney, Agent, or Firm* — Finnegan, Henderson, Farabow, Garrett & Dunner, LLP

(57) ABSTRACT

Embodiments of the disclosure provide a communication interface framework, a message sending method and device based on a communication interface framework, a message receiving method and device based on a communication interface framework, and a communication system. The communication interface framework comprises: a device layer, a core layer and a protocol layer, wherein the device layer comprises a transmission device for providing the framework with, when transmitting data information, a transmission interface for transmitting the data information; the core layer comprises an interface protocol, a sending queue, and a receiving queue; and the protocol layer comprises a user mode application program interface and a kernel mode application program interface.

13 Claims, 5 Drawing Sheets

(51) Int. Cl.
*H04M 3/56* (2006.01)
*G06F 9/54* (2006.01)
*G06F 9/455* (2018.01)

(52) U.S. Cl.
CPC .............. *G06F 9/546* (2013.01); *H04L 67/26* (2013.01); *H04L 67/2842* (2013.01); *H04M 3/569* (2013.01)

(58) Field of Classification Search
CPC .. G06F 12/1081; G06F 9/45558; G06F 9/545; G06F 21/6254; G06F 21/60; G06F 21/606; G06F 21/6245; G06Q 20/383
See application file for complete search history.

(56) References Cited

U.S. PATENT DOCUMENTS

| | | | | |
|---|---|---|---|---|
| 7,430,211 | B2* | 9/2008 | Elzur | H04L 47/621 370/412 |
| 9,537,801 | B1* | 1/2017 | Telfer | H04L 49/9057 |
| 2003/0050990 | A1* | 3/2003 | Craddock | H04L 29/06 709/212 |
| 2003/0219033 | A1* | 11/2003 | Silvester | H04L 29/06 370/469 |
| 2004/0022199 | A1 | 2/2004 | Hammons et al. | |
| 2004/0249950 | A1 | 12/2004 | Christensen et al. | |
| 2005/0210479 | A1* | 9/2005 | Andjelic | H04L 49/90 719/321 |
| 2007/0116195 | A1 | 5/2007 | Thompson et al. | |
| 2008/0137686 | A1* | 6/2008 | Agarwal | H04W 4/02 370/474 |
| 2009/0234963 | A1 | 9/2009 | Philbrick et al. | |
| 2010/0169501 | A1* | 7/2010 | King | G06F 9/455 709/230 |
| 2010/0226247 | A1 | 9/2010 | Plamondon | |
| 2010/0333115 | A1 | 12/2010 | Yospe et al. | |
| 2011/0116512 | A1* | 5/2011 | Crupnicoff | H04L 67/14 370/463 |
| 2012/0033673 | A1* | 2/2012 | Goel | H04L 47/30 370/400 |
| 2012/0127887 | A1* | 5/2012 | Kang | H04L 12/4633 370/252 |
| 2012/0144054 | A1* | 6/2012 | Van Velzen | H04L 65/605 709/231 |
| 2013/0166681 | A1 | 6/2013 | Tervela et al. | |
| 2013/0332987 | A1* | 12/2013 | Tenneti | G06F 21/10 726/1 |
| 2014/0101355 | A1* | 4/2014 | Borkowski | G06F 13/4059 710/310 |
| 2014/0173127 | A1 | 6/2014 | Samuels et al. | |
| 2014/0214683 | A1* | 7/2014 | Dominick | G16H 10/60 705/51 |
| 2015/0044983 | A1 | 2/2015 | Nasir et al. | |

FOREIGN PATENT DOCUMENTS

| | | |
|---|---|---|
| CN | 1787495 A | 6/2006 |
| CN | 102122255 A | 7/2011 |
| CN | 102971723 A | 3/2013 |
| CN | 103888441 A | 6/2014 |
| CN | 103945013 A | 7/2014 |
| CN | 105071976 A | 11/2015 |
| KR | 20030055416 A | 7/2003 |
| WO | WO 2017/161164 A1 | 9/2017 |

OTHER PUBLICATIONS

Silberschatz et al., "Operating System Concepts," 4th Edition—passages, pp. 68, 73, 76-78 and 649-654 (1994).
PCT International Search Report dated Jul. 12, 2017, issued in corresponding International Application No. PCT/US2017/022778 (15 pgs.).
Venkateswaran, "Linus wireless networking", IBM developerWorks, Mar. 2, 2004, (May 2, 2004), Retrieved on Jun. 20, 2017. Retrieved from the Internet <URL: https://www.ibm.com/developerworks/linux/library/wi-enable/index.html> entire document (15 pgs.).
First Chinese Office Action issued in Chinese Application No. CN201610154122.5 dated Sep. 24, 2019, 29 pages.
First Chinese Search Report issued in Chinese Application No. CN201610154122.5, dated Sep. 12, 2019, 2 pages.

* cited by examiner

METHOD AND DEVICE FOR MESSAGE SENDING AND RECEIVING BASED ON A COMMUNICATION INTERFACE FRAMEWORK

CROSS REFERENCE TO RELATED APPLICATION

The present application is based on and claims the benefits of priority to Chinese Application No. 201610154122.5, filed Mar. 17, 2016, the entire contents of which are incorporated herein by reference.

TECHNICAL FIELD

The disclosure relates to a field of communication technology, and specifically to a communication interface framework and a communication system according to a communication interface framework. The disclosure also includes a message-sending method, device, and apparatus based on a communication interface framework. The disclosure also includes, a message-receiving method, device, and apparatus based on a communication interface framework.

BACKGROUND

In cloud computing or computer processing environments, communication often needs to be carried out between processes, between virtual machines, or between a virtual machine and a host machine in an operation system. In these types of environments, a communication mechanism can assist with facilitating communications between these components.

Generally, communication mechanisms include the following:

1. Inter-Process Communication (IPC). IPC is a communication mechanism, through which data and messages can be exchanged between user mode processes, between kernel components (sub-systems), or between a kernel and a user process in an operating system. IPC includes a local mechanism (such as a Windows shared memory) or a network mechanism (such as a Windows socket). Methods for IPC may include: a Socket method, a clipboard method, a memory mapping file method, a mailslot method, a named pipe method and an anonymous pipe method.

2. Bridged Method. An Internet Protocol (IP) address of a virtual system is configured to be in a same network segment as a host system by the bridged method. The virtual system is equivalent to an independent machine inside a network and inserted on a same HUB with the host system. Other machines in the network may access the virtual machine, the virtual machine may access the other machines in the network, and the virtual machine and the host system can also access each other.

3. Network Address Translation (NAT) Method. A virtual machine uses a virtual network interface card (e.g., Vmnet8) in a host computer as a gateway, by NAT and Dynamic Host Configuration Protocol (DHCP) services provided by VMware. In this way, communication between the host computer and the virtual machine can be realized, and the virtual machine can also access the Internet. However, the Internet cannot access the virtual machine.

4. Host-only Method. The host-only method can only allow network communication between a virtual machine and a host machine, and therefore the virtual machine cannot access an external network that is outside the host machine.

It can be seen that, in the existing communication mechanisms, the first communication mechanism is Inter-Process Communication, and is unable to cross virtualized boundaries. That is, the first communication mechanism can only be applied within the same operating system.

Other communication mechanisms (e.g., the bridged method, the NAT method, and the host-only method) may cross the virtualized boundaries. But these communication mechanisms need to be implemented based on network communication semantics and cannot support message delivering and filtering between kernel components, even these communication mechanisms are based on socket interfaces.

Each of the communication mechanisms operates independently, and is only responsible for communications within its own scope. Thus, the communication mechanisms cannot be easily extended.

SUMMARY

Embodiments of the disclosure provide a communication interface framework, a message sending method based on the communication interface framework, a message receiving method based on the communication interface framework and a communication system, so as to solve the above-mentioned problems. Embodiments of the disclosure also relate to a message sending device based on a communication interface framework and an electronic apparatus, and a message receiving device based on a communication interface framework and an electronic apparatus.

Consistent some embodiments of the disclosure, a communication interface framework is provided, comprising a device layer, a core layer and a protocol layer, wherein the device layer comprises a transmission device for providing the framework with, when transmitting data information, a transmission interface for transmitting the data information; the core layer comprises an interface protocol to provide interfaces for different protocols used during calls for the protocol layer, a sending queue to store the data information be sent to other transmission devices, and a receiving queue to store the data information received from the other transmission devices; and the protocol layer comprises a user mode application program interface for a system call to push or release the data information to a queue, and a kernel mode application program interface for calls for a user process and kernel components to push or release the data information to the queue.

Consistent with some embodiments of the disclosure, a message sending method based on a communication interface framework is provided, comprising: acquiring, via an application program interface, data information to be sent; calling a transmission interface of a local transmission device after acquiring the data information; and sending the data information via the transmission interface to a demander transmission device of a demander demanding the data information.

Consistent with some embodiments of the disclosure, a message sending device based on a communication interface framework is provided, comprising: a data information acquisition unit for acquiring, via an application program interface, data information to be sent; a transmission interface calling unit for calling a transmission interface of a local transmission device after acquiring the data information; and a data information sending unit for sending the data information via the transmission interface to a demander transmission device of a demander demanding the data information.

Consistent with some embodiments of the disclosure, an electronic apparatus is provided, comprising: a display; a processor; and a memory for storing a message sending program, wherein the message sending program is executable by the processor to perform: acquiring, via an application program interface, data information to be sent; calling a transmission interface of a local transmission device after acquiring the data information; and sending the data information via the transmission interface to a demander transmission device of a demander demanding the data information.

Consistent with some embodiments of the disclosure, a message receiving method based on a communication framework is provided, comprising: receiving, via a local transmission device, data information sent by a transmission device of a sender; clearing, after the transmission device receives the data information, information of the sender carried in the data information; and reading, via an application program interface, the data information from which the information of the sender is cleared.

Consistent with some embodiments of the disclosure, a message receiving device based on a communication interface is provided, comprising: a data information receiving unit for receiving, via a local transmission device, data information sent by a transmission device of a sender; a clearing unit for clearing information of the sender carried in the data information after the data information is received by the transmission device; and a data information reading unit for reading, via the application program interface, the data information from which the information of the sender is cleared.

Consistent with some embodiments of the disclosure, an electronic apparatus is provided, comprising: a display; a processor; a memory for storing a message receiving program, the program is executable by the processor to perform: receiving, via a local transmission device, data information sent by a transmission device of a sender; clearing information of the sender carried in the data information after the data information is received by the transmission device; reading, via the application program interface, the data information from which the information of the sender is cleared.

Embodiments of the disclosure provide a communication interface framework comprising a device layer, a core layer and a protocol layer, wherein the device layer comprises a transmission device for providing the framework with, when transmitting data information, a transmission interface for transmitting the data information; the core layer comprises an interface protocol to provide interfaces for different protocols used during calls for the protocol layer, a sending queue to store the data information that needs to be sent to other transmission devices, and a receiving queue to store the data information received from the other transmission devices; and the protocol layer comprises a user mode application program interface for a system call to push or release the data information to a queue, and a kernel mode application program interface for calls for a user process and kernel components to push or release the data information to a queue. In the technical solution, the transmission device in the device layer provides a transmission interface for transmitting the data information to the framework when transmitting data information, thereby realizing a uniform and simplified communication mechanism. The communication mechanism is not limited to the communication between user mode ordinary processes, but also can be between kernel components (sub-systems), or between a kernel and a user process. At the same time, virtualized boundaries can be crossed by a customized protocol interface, so as to perform efficient and reliable information exchange between free combinations of virtual machine kernel-user mode-host machine kernel-user mode. The communication interface framework is not limited within one operating system, but can support communication between virtual machines, and communication between a virtual machine and a host machine. Data processing is implemented in a simplified communication mode, and a variety of extension frameworks is provided. Compared with general Inter-Process Communication (IPC), embodiments of the disclosure have a better extensibility, and are more applicable to communication models of cloud computing.

BRIEF DESCRIPTION OF THE DRAWINGS

The drawings herein are provided, as a part of the disclosure, for further understanding of the disclosure. Illustrative embodiments of the disclosure and description thereof are used to explain the disclosure, and are not restrictive. In the drawings.

DETAILED DESCRIPTION

Figure 1:
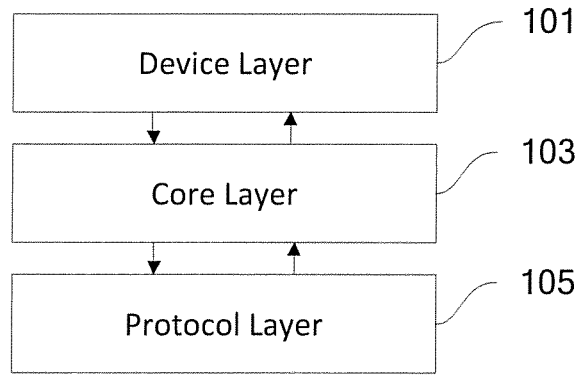
FIG. 1 illustrates a schematic diagram of a communication interface framework, according to embodiments of the disclosure.

Reference will now be made in detail to the disclosed embodiments, examples of which are illustrated in the accompanying drawings. Wherever convenient, the same reference numbers will be used throughout the drawings to refer to the same or like parts.

The objects, features, and characteristics of the disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended as a definition of the limits of the invention. As used in the specification and in the claims, the singular form of "a", "an", and "the" include plural referents unless the context clearly dictates otherwise.

The embodiments of the disclosure provide a communication interface framework; a message-sending method, device, and apparatus based on a communication interface framework; a message-receiving method, device, and apparatus based on a communication interface framework; and a communication system. They will be described in details one by one in the embodiments below.

Generally, Inter-Process Communication (IPC) is only used in an operating system that exchanges data and messages between user mode processes, between user between kernel components (sub-systems), or between a kernel and a user process. However, for example, under socket-based IPC mechanisms, the exchange of data and messages are unable to cross virtualized boundaries. That is, the exchange is only performed within the same operating system.

By means of a bridged method, machines other than the host running a virtual machine in the network can access the virtual machine. The virtual machine can also access the host and other machines in the network.

By means of a NAT method, communication can only be realized between a host machine and a virtual machine. Or, by means of a host-only method, network communication can only be realized between a virtual machine and a host machine as well. The other three virtualized boundary crossing communication mechanisms cannot enable communication between processes during communication, each of the communication mechanisms operates independently, and each communication mechanism is only responsible for communication in a scenario thereof, causing limitations in a deep extension.

While these other communication mechanisms have issues, the embodiments described herein provide a uniform and simplified communication mechanism. This improved communication mechanism can include a device layer that includes a transmission device configured to provide, when transmitting data information, the framework with a transmission interface for transmitting the data information. The improved communication mechanism is not limited to the communication between user mode ordinary processes, but also can be between kernel components (sub-systems), or between a kernel and a user process. At the same time, with reference to a customized protocol interface, virtualized boundaries can be crossed, so as to perform efficient and reliable information exchange between free combinations of virtual machine kernel-user mode-host machine kernel-user mode; thus the communication interface framework is not limited in one operating system, but can support communication between virtual machines as well as the communication between a virtual machine and a host machine, thus realizing an extensible light-weight Inter-Process Communication (IPC) mechanism.

The embodiments of the disclosure provide a communication interface framework. The embodiment of the communication interface framework is as follows:

FIG. 1 illustrates a schematic diagram of a communication interface framework provided by the embodiments of the disclosure. The communication interface framework may include a device layer 101, a core layer 103, and a protocol layer 105.

Device layer 101 can include a transmission device configured for providing, when transmitting data information, the framework with a transmission interface for transmitting the data information.

Core layer 103 may include an interface protocol, a sending queue, and a receiving queue. The interface protocol may be configured for providing interfaces for different protocols used during calls performed by the protocol layer. The sending queue may be configured for storing the data information to be sent to other transmission devices. And the receiving queue is configured for storing the data information received from other transmission devices.

Protocol layer 105 may include a user mode application program interface and a kernel mode application program interface. The user mode application program interface is configured for a system call to push or release the data information to a queue. And the kernel mode application program interface is configured for calls of a user process and various kernel components to push or release the data information to a queue.

In some embodiments, the communication interface framework is an extended Inter-Process Communication (IPC). The extended communication interface framework is not limited to the communication between user mode ordinary processes, but also can be between kernel components, or between a kernel and a user process. At the same time, with reference to a customized protocol interface, virtualized boundaries can be crossed, communication between virtual machines is supported, and the communication between a virtual machine and a host machine can also be supported. According to the particular function realized, the communication interface framework can also be called an Advanced Virtualization Management Interface, which is referred to as AVMI for short in the description below.

It should be noted that, a framework is a re-usable design in an entire system or a part of the system, and is embodied as an interaction method between a set of abstract components and component instances. In other words, a framework is a re-usable design component, specifying an architecture of an application and clarifying dependence relationships, responsibility allocation and a control flow between the entire design and coordinated components. The framework is embodied as a coordination method between a set of abstract classes and instances thereof, and provides a context relationship for component reuse. Therefore, a large-scale reuse of a component library also requires a framework. The framework method in the field of components borrows ideas from the achievements in hardware technique development to a great extent, and it is a combination of the component technique, software architecture research and application software development. In many cases, a framework generally appears in the form of a component library, but the component library is just an important portion of the framework. One of the key points of the framework also lies in the interaction mode and a control low mode between objects in the framework.

Device layer 101, core layer 103 and protocol layer 105 of the communication interface framework will be described in details below.

In some embodiments, device layer 101 consists of a transmission device, AVMI Device (Transmitters). The transmission device supports a transmission function. As a device interface for transmitting data information in the device layer 101, the transmission device does not need to support other extended protocols in the framework, but merely transmits data. During data delivery, the transmission of the data is triggered by a transceiving notification mechanism (e.g. interruption). A process of transmission is implemented by means of a memory copy, rather than a practical physical device. For different requirements, any communication interface can serve as a carrier for data delivery, e.g. a network card, a disk, a serial port or a virtual device (para-virtual device).

It should be noted that, with respect to different application environments, for example, communications between a kernel component and a user mode component in a process may not pass the device layer 101. And for communications between virtual machines and communications between a virtual machine and a host machine, the device layer 101 may be necessary.

Core layer 103 may include an interface protocol, a sending queue, and a receiving queue. The interface protocol is configured for providing interfaces for different protocols used during calls performed by the protocol layer 105. For example, the interfaces are provided for a user mode system call (open/close/readv/writev/read/write/poll/epoll) for the protocol layer 105, and provide a kernel interface for other kernel components. The sending queue is configured for storing the data information written into the sending queue in the protocol layer 105, and calling a transmission interface of the device layer 101 to send the data information in the sending queue to other transmission devices. The receiving queue is configured for storing data information received by the device layer 101 from the other transmission devices through an interruption mechanism.

It should be noted that, the data transmitted in the sending queue and the receiving queue is transmitted based on a communication mode of a message. The message contains a message head and a message body. The message body stores specific data information for transmitting, and the message head contains information describing the message, such as a message type and a serial number of the message. It should be understood that core layer 103 is configured for realizing the sending and receiving of an AVMI message, one or more queues, and various protocol interfaces.

Core layer 103 may further include a scheduler. The scheduler is configured for pushing the data information to a corresponding queue. For example, after receiving the data information by device layer 101 from other transmission devices via the interruption mechanism, core layer 103 pushes the data information into a protocol queue corresponding to the message type according to the message type of the message carrying the data information.

Protocol layer 105 may include a user mode application program interface and a kernel mode application program interface. The user mode application program interface is configured for a system call to push or release the data information to a queue. The kernel mode application program interface is configured for calls of a user process and various kernel components to push or release the data information to a queue.

Protocol layer 105 may further include an interface processor. The interface processor is configured for querying, according to the message type of the message carrying the data information, a protocol corresponding to the message type during the calls performed by the protocol layer.

It should be noted that, a data flow direction in the communication interface framework is as follows: after acquiring from the protocol layer 105 the message carrying the data information to be sent, a data sender transmits the acquired message to core layer 103, so that the core layer 103 calls the transmission interface in the device layer 101 to send the acquired message to a transmission device of a demander; device layer 101 of the demander acquires the message and triggers core layer 103 of the demander to schedule the message and determine a reliability of the message, and places the message into the receiving queue of the demander when the message is determined to be reliable, so that protocol layer 105 of the demander acquires the demanded data information from the message in the receiving queue.

Figure 2:
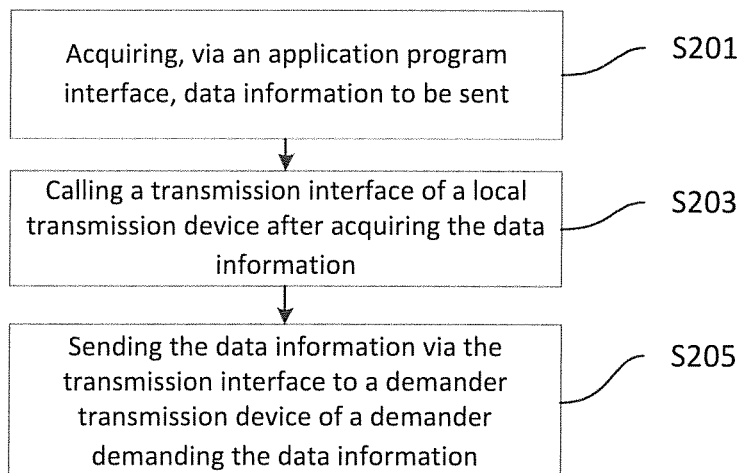
FIG. 2 illustrates a flow chart of a message sending method based on the communication interface framework, according to embodiments of the disclosure.

In the above-mentioned embodiments, a communication interface framework is provided. In addition, embodiments of the disclosure also provide a message sending method based on a communication interface framework. An embodiment of the message sending method based on a communication interface framework is as follows:

FIG. 2 illustrates a flow chart of a message sending method based on a communication interface framework according to the embodiments of the disclosure.

The message sending method based on a communication interface framework may include:

Step S201 includes acquiring, via an application program interface, data information to be sent. In some embodiments, this step is completed in a protocol layer of a communication interface framework, and the step of acquiring, via an application program interface, data information to be sent can be realized in the following way: an application program acquires the data information to be sent, through a user mode application program interface or a kernel mode application program interface. For example, an application program running on the current system acquires data information via a read/write operation from local.

It should be noted that the data information to be sent refers to: data information that is acquired by an application program running on other virtual machines applying to an application program running on the current system or different processes in the same system.

It should be noted that when a task (a process) is executing kernel codes due to the system call, the process is referred to be in a kernel running mode (or a kernel mode for short). At this time, a processor is under execution of kernel codes with the highest privilege level (level 0). When the process is in the kernel mode, the executed kernel code would use a kernel stack of the current process. Each process has its own kernel stack. When the process executes user-own code (e.g., from an application), it is referred to be in a user running mode (i.e., a user mode). That is, the processor is under execution of the user code with the lowest privilege level (level 3). When executing a user program is suddenly interrupted by an interruption program, the user program can also be symbolically referred to be a kernel mode of the process, since the interruption processing program would use the kernel stack of the current process. For example, when a user runs a program, a process created by the program is running in a user mode at the beginning. When operations (such as, a file operation, network data sending, and the like) are to be executed, codes in a kernel will be called by system calls (such as, write, send and the like) to accomplish the operations. In this case, the program enters an address space of the kernel to execute these codes to accomplish the operations, and then returns to the user mode. In this way, the program in a user mode would not be able to operate the address space of the kernel at will, therefore providing security and protection to some extent.

In some embodiments, the data information is acquired in a form of a message. For example: in step S201, a message is acquired through an application program interface. The message carries data information to be sent. It should be noted that the message comprises a message head and a message body, wherein the message body stores specific data information and the message head contains information describing the message such as the message type and the serial number of the message.

After acquiring through the application program interface the message carrying the data information to be sent, the protocol layer transmits the acquired message to the core layer. Therefore, after step S201 of acquiring through an application program interface the data information to be sent, the acquired message can be pushed to the sending queue, including steps S202-1 to S202-2 in particular. Explanation is further made with reference to FIG. 3 below.

Figure 3:
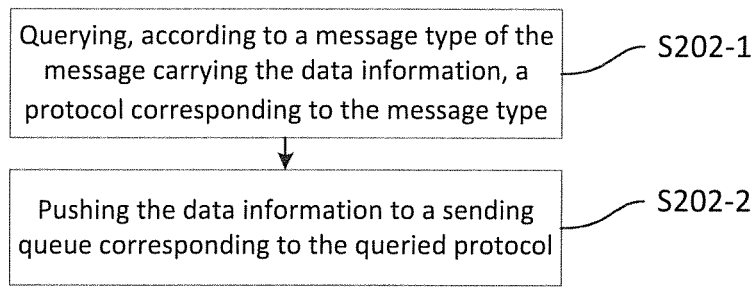
FIG. 3 illustrates a flow chart of pushing a received message to a sending queue, according to embodiments of the disclosure.

FIG. 3 illustrates a flow chart of pushing the acquired message to the sending queue according to the embodiments of the disclosure.

Step S202-1: querying, according to a message type of the message carrying the data information, a protocol corresponding to the message type.

In some embodiments, querying, according to a message type of the message carrying the data information, a protocol corresponding to the message type can be realized in the following way: querying via an interface processor whether registered protocols in interface protocols include a protocol corresponding to a message type of the message carrying the data information. It should be noted that the registered protocols in the interface protocols are: protocols registered with the core layer in protocol initialization.

It can be understood that, if the registered protocols in interface protocols include a protocol corresponding to a message type of the message carrying the data information, step S202-2 is triggered and executed. And if the registered protocols in interface protocols do not include a protocol corresponding to a message type of the message carrying the data information, the message carrying the data information is discarded.

Step S202-2: pushing the data information to a sending queue corresponding to the queried protocol.

In some embodiments, pushing the data information to a sending queue corresponding to the queried protocol can be implemented in the following way: according to the queried protocol corresponding to the message type, querying a message queue corresponding to the protocol, and writing the message carrying the data information into the sending queue.

It should be noted that the message queue is a container for storing messages during a message transmission. A message queue manager plays a role of an intermediary when relaying the message from a source thereof to its target. A primary purpose of the queue is to provide a route and ensure the delivery of messages. The sending queue is a queue configured for storing a message carrying the data information to be sent to other transmission devices.

In some specific implementations, pushing the data information to a sending queue corresponding to the queried protocol is implemented by pushing the data information to the sending queue corresponding to the protocol by means of a callback function corresponding to the queried protocol.

It should be noted that the callback function is a function called via a function pointer. When the pointer (address) of a function is delivered to another function as a parameter and this pointer is used for calling the function to which the pointer points to, the function is called a callback function. The callback function is not directly called by an implementation party of the function, but is called by another party in the case of a specific event or condition, so as to respond to the event or condition.

It can be understood that the protocol interface can be chosen to realize any customized protocol based communication and execute a customized process of a kernel; so before a callback function is executed, it also needs to be registered with the protocol interface in the core layer in protocol initialization.

It should be noted that during a message transmission between the protocol layer and the core layer, a message queue of the protocol layer can be sent to the core layer under the condition that a channel is established. Therefore, after pushing the message carrying the data information to the sending queue corresponding to the protocol, a channel for transmitting the message carrying the data information should be established between the protocol layer and the core layer.

In some embodiments, establishing a channel for transmitting the message carrying the data information can be implemented in the following way: when establishing a communication connection between the protocol layer and the core layer, the protocol layer and the core layer (a user mode program or a kernel component) respectively open a same channel and synchronize respective context information, and establishes the channel for transmitting the message carrying the data information.

For example, Channel ID and Domain ID. Channel can be named, and Domain refers to an ID of a virtual machine or a host machine. If a communication is inside a virtual machine, then Domain IDs are the same. And if the communication crosses virtual machines (such as a communication between a virtual machine and a host machine), the Domain IDs are different. Domain IDs can be globally defined or generated randomly, but should avoid repetition.

Referring back to FIG. 2, the message sending method proceeds to step S203: Step S203 includes calling a transmission interface of a local transmission device after acquiring the data information.

In some embodiments, calling a transmission interface of a local transmission device after acquiring the data information can be realized in the following way: calling the transmission interface of the local transmission device after acquiring the data information asynchronously.

It should be noted that an asynchronous communication is a communication method that has a simple demand on devices. Standard communication interfaces provided by computers communicate via asynchronous communication. In the asynchronous communication, a common clock is not required between two parties. That is, a receiver does not know when a sender sends information. Therefore, the sent information should contain information for prompting the receiver to start receiving (e.g. a start bit, likewise, a stop bit is provided in the end).

In some embodiments, a sending queue stored in a current cache can be cleared before executing calling step S203. By clearing the sending queue beforehand, it is ensured that the information to be sent includes messages carrying the data information that the demander demands when a transmission interface of a local transmission device is called after acquiring the data information asynchronously.

Moreover, in some embodiments, a reliability confirmation can be conducted to ensure the reliability in transmitting the message carrying the data information. The reliability confirmation can include: re-transmitting the sending queue; and detecting a serial number of the data information in the sending queue.

It should be noted that, a re-transmission mechanism includes re-transmitting a data package according to a checked clock of its own in the case of ACK timeout. The re-transmission mechanism comprises: a segmented re-transmission and a fast re-transmission.

It can be understood that, the sending queue is re-transmitted by triggering asynchronous reliability re-transmission logic, and the purpose of re-transmission is to ensure that the message carrying the data information is continuously transmitted to the device layer asynchronously and reliably.

In some embodiments, detecting a serial number of data information in the sending queue can be implemented in the following way: acquiring the serial number from the message head by reading the message head of the message carrying the data information, and checking whether the message is ordered via the serial number. It should be noted that, the serial number carried in the message head of the message is the serial number of the message in the sender.

Step S205 includes sending the data information via the transmission interface to a demander transmission device of a demander demanding the data information.

In some embodiments, sending the data information via the transmission interface to a demander transmission device of a demander demanding the data information can be implemented in the following way: the transmission interface of the local device layer transmits the message carrying the data information to the demander transmission device of the demander demanding the data information by means of a memory copy.

It can be understood that the core layer would continuously send out the message carrying the data information in the sending queue by calling the transmission interface of the device layer, by triggering asynchronization, so as to ensure that the message carrying the data information is continuously transmitted to the device layer asynchronously.

It should be noted that the local transmission device should be activated in the device layer before executing step S205 of sending the data information via the transmission interface to a transmission device of a demander demanding the data information.

In a message sending method based on a communication interface framework provided in the embodiments of the disclosure, by arranging a device layer, the transmission device in the device layer is used to provide, when transmitting data information, the framework with a transmission interface for transmitting the data information, thereby realizing a uniform and simplified communication mechanism. The communication mechanism is not limited to the communication between user mode ordinary processes, but also can be between kernel components, or between a kernel and a user process. At the same time, with reference to a customized protocol interface, virtualized boundaries can be crossed, so as to perform efficient and reliable information exchange between free combinations of virtual machine kernel-user mode-host machine kernel-user mode. Thus the communication interface framework is not limited in one operating system, but can support communication between virtual machines, and can also support the communication between a virtual machine and a host machine. Data processing is carried out in a simplified communication mode, and rich extension frameworks are provided. Compared with the traditional Inter-Process Communication (IPC), the embodiments described herein have better extensibility, and are more applicable to communication models of cloud computing.

In the above embodiments, a message sending method based on a communication interface framework is provided. Corresponding to the message sending method based on a communication interface framework, embodiments of the disclosure further provide a message sending device based on a communication interface framework. Because the device incorporates the functionalities described above in the corresponding methods, description of the device has been simplified. Please refer to description for the embodiments of the method. Description for the device is merely illustrative. Embodiments of a message sending device based on a communication interface framework are described as below.

Figure 4:
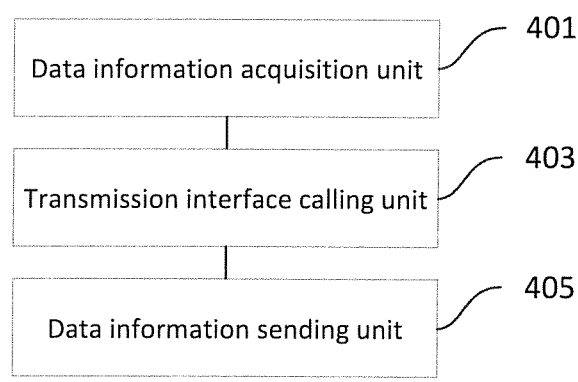
FIG. 4 illustrates a message sending device based on a communication interface framework, according to embodiments of the disclosure.

FIG. 4 illustrates a message sending device based on a communication interface framework according to embodiments of the disclosure.

The message sending device based on a communication interface framework may comprise: a data information acquisition unit 401, a transmission interface calling unit 403, and a data information sending unit 405. Each of these units (and subsequent identified units or sub-units) can be a packaged functional hardware unit designed for use with other components (e.g., portions of an integrated circuit) or a part of a program (stored on a computer readable medium) that performs a particular function of related functions. For example, these units may be implemented by the application programming interfaces (API) or functions of machine emulators and virtualizers, such as VIRTIO or QEMU.

Data information acquisition unit 401 may be configured for acquiring, via an application program interface, data information to be sent.

Transmission interface calling unit 403 may be configured for calling a transmission interface of a local transmission device after acquiring the data information.

Data information sending unit 405 may be configured for sending the data information via the transmission interface to a transmission device of a demander demanding the data information.

For example, data information is acquired and transmitted in a form of a message.

In some embodiments, the message sending device based on a communication interface framework further comprises:

a protocol query unit for querying, according to a message type of the message carrying the data information, a protocol corresponding to the message type after acquiring, via an application program interface, data information to be sent; and a pushing unit for pushing the data information to a sending queue corresponding to the queried protocol. For example, the pushing unit pushes the data information to the sending queue corresponding to the protocol by means of a callback function corresponding to the queried protocol.

In some embodiments, the message sending device based on a communication interface framework further comprises:

a channel establishment unit for establishing a channel for transmitting the message carrying the data information, before acquiring, via the application program interface, the data information to be sent.

For example, transmission interface calling unit 403 calls the transmission interface of the local transmission device after acquiring the data information asynchronously.

In some embodiments, the message sending device based on a communication interface framework further comprises:

a queue clearance unit for clearing a sending queue stored in a current cache, before calling the transmission interface of the local transmission device after acquiring the data information.

In some embodiments, the message sending device based on a communication interface framework further comprises:

a re-transmission unit for re-transmitting the sending queue after clearing the sending queue stored in the current cache; and a serial number detection unit for detecting a serial number of the data information in the sending queue.

In some embodiments, the message sending device based on a communication interface framework further comprises:

an activation unit for activating the local transmission device before sending the data information via the transmission interface to the transmission device of the demander demanding the data information.

In the above embodiments, a communication interface framework, a message sending method based on a communication interface framework, and a message sending device based on a communication interface framework are provided. Besides, embodiments of the disclosure further provide an electronic apparatus. Embodiments of the electronic apparatus are described as below.

Figure 5:
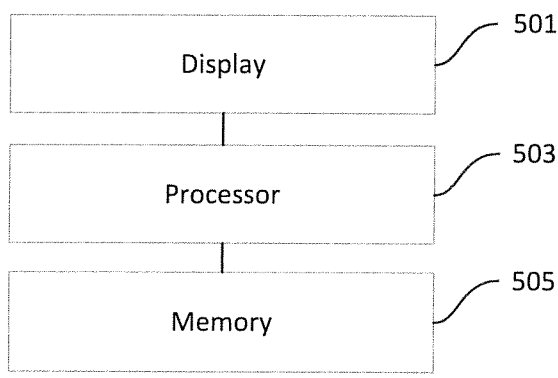
FIG. 5 illustrates a schematic diagram of an electronic apparatus, according to embodiments of the disclosure.

FIG. 5 illustrates a schematic diagram of the electronic apparatus provided by embodiments of the disclosure.

The electronic apparatus may include: a display 501; a processor 503; and a memory 505.

Memory 505 is configured for storing a message sending program. The message sending program is executable by the processor to perform:

acquiring, via an application program interface, data information to be sent;

calling a transmission interface of a local transmission device after acquiring the data information; and sending the data information via the transmission interface to a transmission device of a demander demanding the data information.

It is appreciated that the message sending program incorporates the previously disclosed functionality provided in the embodiments of the present disclosure.

In the above embodiments, a communication interface framework, a message sending method based on a communication interface framework, a message sending device based on a communication interface framework, and an electronic apparatus are provided. Besides, embodiments of the disclosure further provide a message receiving method based on a communication interface framework. Embodiments of the message receiving method based on a communication interface framework are described as below.

Figure 6:
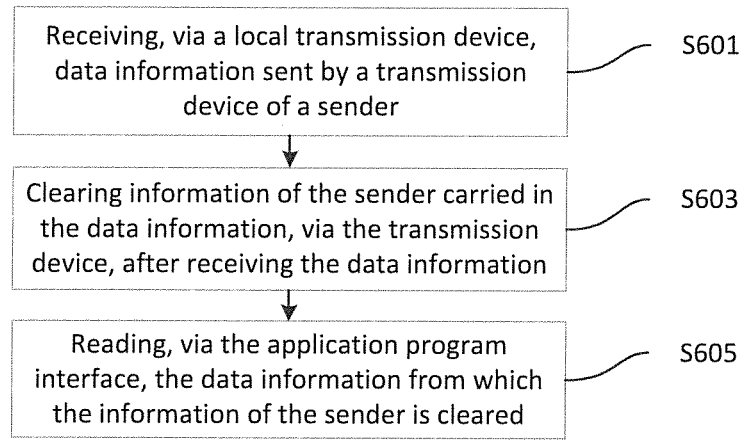
FIG. 6 illustrates a flow chart of a message receiving method based on the communication interface framework, according to embodiments of the disclosure.

FIG. 6 illustrates a flow chart of a message receiving method based on a communication interface framework according to the embodiments of the disclosure.

The message receiving method based on a communication interface framework comprises:

Step S601 includes receiving, via a local transmission device, data information sent by a transmission device of a sender.

In some embodiments, the local transmission device receives data information sent by a transmission device of a sender by means of: the local transmission device triggers, via a transceiving notification mechanism of the device layer, data transmission conducted by means of a memory copy, and receives the data information sent by the transmission device of the sender.

In some implementations, the local transmission device receiving the data information sent by the transmission device of the sender is realized by: notifying through an interruption operation the local transmission device to receive the data information sent by the transmission device of the sender.

It should be noted that, interruption refers to: when required, a CPU temporarily stops running a current program and executes a program and a running process for processing a new situation in turn. That is, while running a program, if a situation that must be processed by the CPU immediately occurs in the system, the CPU temporarily stops running the program and processes the new situation in turn. The above process is referred to as an interruption.

In some embodiments, the data information is acquired in a form of a message. For example, in step S601, a local transmission device receives a message carrying data information sent by a transmission device of a sender, with the message carrying data information to be sent. It should be noted that, the message comprises a message head and a message body, wherein the message body stores particular data information and the message head contains information describing the message, such as the message type and the serial number of the message.

It should be noted that, in order to ensure that the device layer can receive the message carrying the required data information, the local transmission device should be activated in the device layer before executing step S601 of a local transmission device receiving data information sent by a transmission device of a sender.

In some embodiments, after receiving the data information sent by the transmission device of the sender, the device layer would trigger the core layer by means of callback, so that the core layer executes a corresponding processing operation on the message carrying the data information.

Step S603: clearing, via the transmission device, information of the sender carried in the data information, after receiving the data information.

In some embodiments, the step of clearing information of the sender carried in the data information can be implemented in the following way: reading the message head of the message carrying the data information, and clearing the serial number of the message in the sender, which is carried in the message head of the message, from the message head of the message.

Figure 7:
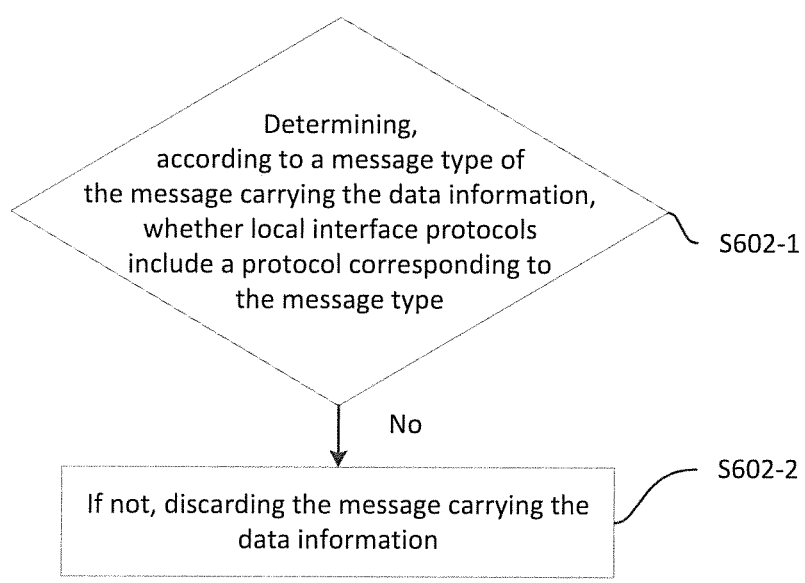
FIG. 7 illustrates a flow chart of determining a type of the message, according to embodiments of the disclosure.

In some embodiments, the type of the message may be determined before the step of clearing information of the sender carried in the data information. By determining the type of the message, a demander is enabled to acquire data information from a message carrying the data information, and avoid the problem of being unable to acquire the data information due to that protocols registered with a protocol interface are different. Determining the type of the message may include steps S602-1 to S602-2 in particular, and explanation is further made with reference to FIG. 7, which illustrates a flow chart of determining the type of the message according to the embodiments of the disclosure.

Step S602-1 includes determining, according to a message type of the message carrying the data information, whether local interface protocols include a protocol corresponding to the message type.

In some embodiments, the step of determining, according to a message type of the message carrying the data information, whether local interface protocols include a protocol corresponding to the message type can be realized in the following way: reading a message head of the message carrying the data information, and acquiring the message type of the message from the message head, and then querying whether registered protocols in local interface protocols include a protocol corresponding to a message type of the message carrying the data information. It should be noted that the registered protocols in the interface protocols are: protocols registered with the core layer in protocol initialization.

It can be understood that if the local interface protocols include a protocol corresponding to the message type of the message, the data information is pushed to a receiving queue corresponding to the protocol according to the message type of the message carrying the data information; and if the registered protocols in local interface protocols do not include a protocol corresponding to a message type of the message carrying the data information, step S602-2 is triggered and executed.

In some embodiments, the step of pushing the data information to a receiving queue corresponding to the protocol according to the message type of the message carrying the data information can be implemented in the following way: according to the queried protocol corresponding to the message type of the message, querying a message queue corresponding to the protocol, and writing the message carrying the data information into the receiving queue.

It should be noted that, the message queue is a container for storing messages during message transmission. A message queue manager plays the role of an intermediary when relaying the message from a source thereof to its target. The primary purpose of the queue is to provide a route and ensure the delivery of messages. The receiving queue is a queue used for storing a message carrying the data information, which is received from other transmission devices.

Step S602-2 includes discarding the message carrying the data information if it is determined that local interface protocols do not include a protocol corresponding to the message type.

In some embodiments, the step of discarding the message carrying the data information can be implemented in the following way: deleting the message carrying the data information locally.

It should be noted that, in some embodiments, checking the message carrying the data information can further comprise: checking the validity of the data, and whether the device layer receiving the message carrying the information and sending the message carrying the data information is correct, which will not be limited herein.

Figure 8:
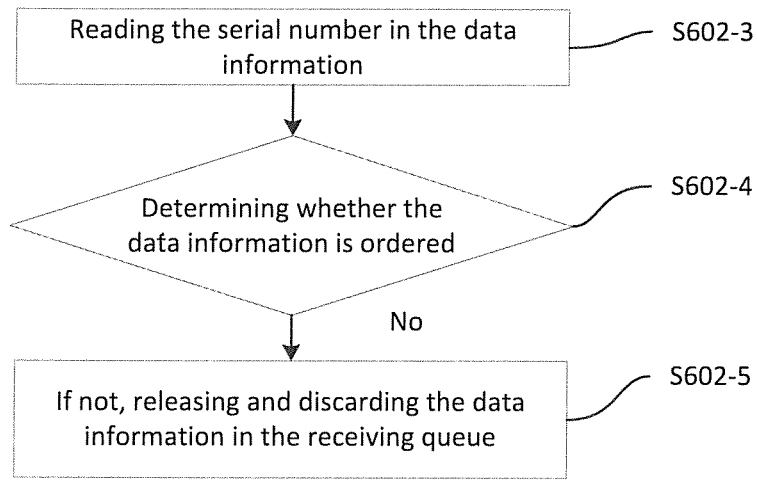
FIG. 8 illustrates a flow chart of performing reliability confirmation, according to embodiments of the disclosure.

In some embodiments, reliability confirmation may be conducted, after pushing the data information to a receiving queue corresponding to the protocol. By conducting the reliability confirmation, the reliability is ensured in transmitting the message carrying the data information. Conducting the reliability confirmation may include steps S602-3 to S602-5 in particular, and explanation is further made with reference to FIG. 8, which illustrates a flow chart of reliability confirmation according to the embodiments of the disclosure.

Step S602-3: reading the serial number in the data information.

In some embodiments, reading the serial number in the data information can be implemented in the following way: reading the serial number of the message from the message head of the message carrying the data information. It should be noted that the serial number carried in the message head of the message is the serial number of the message in the sender.

Step S602-4: determining whether the data information is ordered.

In some embodiments, determining whether the data information is ordered can be implemented in the following way: determining whether the read serial number in the data information in step S602-3 is ordered.

Step S602-5: if not, releasing and discarding the data information in the receiving queue.

In some embodiments, releasing and discarding the data information in the receiving queue can be implemented in the following way: releasing the message which has been pushed to the receiving queue (e.g., enabling the message to leave the queue), and deleting the message carrying the data information locally.

Referring back to FIG. 6, step S605 includes reading, via the application program interface, the data information from which the information of the sender is cleared.

In some embodiments, reading, via the application program interface, the data information from which the information of the sender is cleared can be realized in the following way: an application program reads the data information, in which the information of the sender is cleared, through a user mode application program interface or a kernel mode application program interface. For example, an application program running on a current system reads the data information from the data information, in which the information of the sender is cleared, via a read operation.

Figure 9:
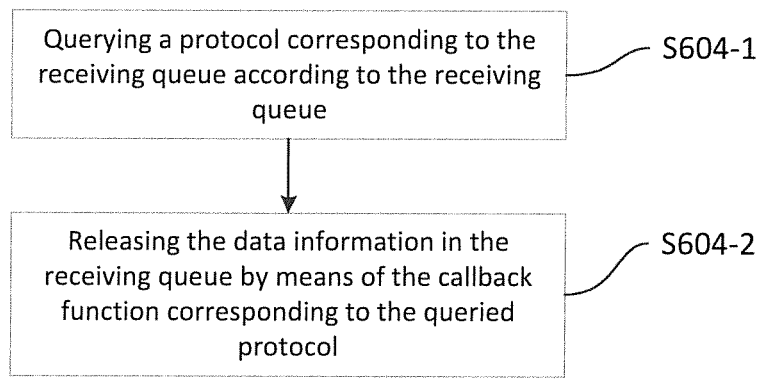
FIG. 9 illustrates a flow chart of releasing a message in a receiving queue, according to embodiments of the disclosure.

It should be noted that since the data information in which the information of the sender is cleared is still in the receiving queue, the application program interface is unable to directly read the message carrying the data information in the receiving queue; therefore, before the step of reading the data information, in which the information of the sender is cleared, through the application program interface, the message in the receiving queue also needs to be released, including steps S604-1 to S604-2 in particular, and explanation is further made with reference to FIG. 9, which illustrates a flow chart of releasing the message in the receiving queue according to the embodiments of the disclosure.

Step S604-1: querying a protocol corresponding to the receiving queue according to the receiving queue.

Step 604-2: releasing the data information in the receiving queue by means of the callback function corresponding to the queried protocol.

In the embodiments, releasing the data information in the receiving queue by means of the callback function corresponding to the queried protocol may be implemented as below. The message that is pushed into the receiving queue is released and the data information in the message body is acquired, according to the callback function in the queried protocol corresponding to the receiving queue in the protocol interface.

In the above embodiments, a message receiving method based on a communication interface framework is provided. Corresponding to the message receiving method based on a communication interface framework, embodiments of the disclosure further provide a message receiving device based on a communication interface framework. Because the device incorporates the functionalities described above in the corresponding methods, description of the device has been simplified. Please refer to description for the embodiments of the method. Description for the device is merely illustrative. Embodiments of a message receiving device based on a communication interface framework are described as below.

Figure 10:
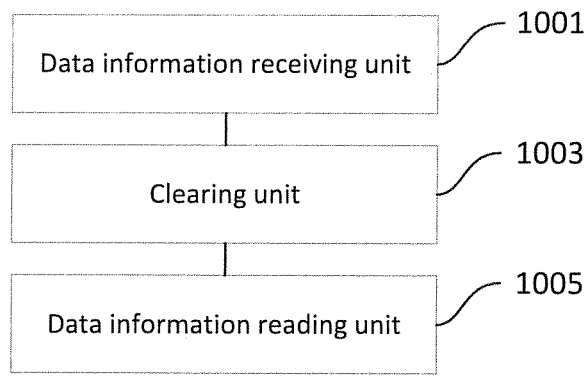
FIG. 10 illustrates a schematic diagram of a message receiving device based on the communication interface framework, according to embodiments of the disclosure.

FIG. 10 illustrates a message receiving device based on a communication interface framework, according to the embodiments of the disclosure.

The message receiving device based on a communication interface framework may include: a data information receiving unit 1001, a clearing unit 1003, and a data information reading unit 1005. Each of these units (and subsequent identified units or sub-units) can be a packaged functional hardware unit designed for use with other components (e.g., portions of an integrated circuit) or a part of a program (stored on a computer readable medium) that performs a particular function of related functions. For example, these units may be implemented by the application programming interfaces (API) or functions of machine emulators and virtualizers, such as VIRTIO or QEMU.

Data information receiving unit 1001 is configured for receiving, via a local transmission device, data information sent by a transmission device of a sender.

Clearing unit 1003 is configured for clearing information of the sender carried in the data information after the data information is received by the transmission device.

Data information reading unit 1005 is configured for reading, via the application program interface, the data information from which the information of the sender is cleared.

For example, the data information is acquired and transmitted in a form of a message.

For example, data information receiving unit 1001 is configured for notifying, through an interruption operation, the local transmission device to receive the data information sent by the transmission device of the sender.

In some embodiments, the message receiving device based on a communication interface framework may further include:

an activation unit for activating the local transmission device before the local transmission device receives the data information sent by the transmission device of the sender.

In some embodiments, the message receiving device based on a communication interface framework may further include:

a protocol determining unit for determining, according to a message type of the message carrying the data information, whether local interface protocols include a protocol corresponding to the message type, before clearing information of the sender carried in the data information;

a discarding unit for receiving a determining result of the protocol determining unit and discarding the message carrying the data information if the result is negative.

In some embodiments, the message receiving device based on a communication interface framework may further include:

a receiving queue pushing unit for receiving the determining result of the protocol determining unit, wherein if the local interface protocols include the protocol corresponding to the message type of the message, the data information is pushed to a receiving queue corresponding to the protocol according to the message type of the message carrying the data information.

In some embodiments, the message receiving device based on a communication interface framework may further include:

a serial number reading unit for reading the serial number in the data information after pushing the data information to a receiving queue corresponding to the protocol;

an order determining unit for determining whether the data information is ordered;

a releasing and discarding unit for receiving the determining result of the order determining unit, and releasing and discarding the data information in the receiving queue.

In some embodiments, the message receiving device based on a communication interface framework may further include:

a protocol querying unit for querying a protocol corresponding to the receiving queue according before reading the data information via the application program interface;

a queue releasing unit for releasing the data information in the receiving queue by means of a callback function corresponding to the queried protocol.

Figure 11:
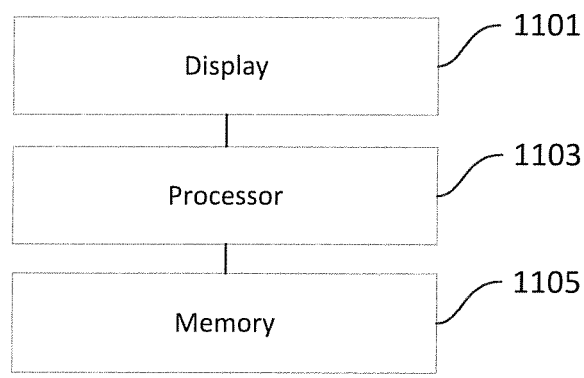
FIG. 11 illustrates a schematic diagram of an electronic apparatus, according to embodiments of the disclosure.

In the above embodiments, a communication interface framework, a message sending method based on a communication interface framework, a message sending device based on a communication interface framework, an electronic apparatus, a message receiving method based on a communication interface framework, and a message receiving device based on a communication interface framework are provided. Besides, embodiments of the disclosure further provide another electronic apparatus. Embodiments of the electronic apparatus are described in FIG. 11, which illustrates a schematic diagram of the electronic apparatus provided by the embodiments of the application.

The electronic apparatus may include: a display 1101; a processor 1103; and a memory 1105.

Memory 1105 is configured for storing a message receiving program. The message receiving program is executable by the processor to perform: receiving, via a local transmission device, data information sent by a transmission device of a sender; clearing information of the sender carried in the data information after the data information is received by the transmission device; reading, via the application program interface, the data information from which the information of the sender is cleared. It is appreciated that the message receiving program incorporates the previously disclosed message-receiving functionality provided in the embodiments of the present disclosure.

Figure 12:
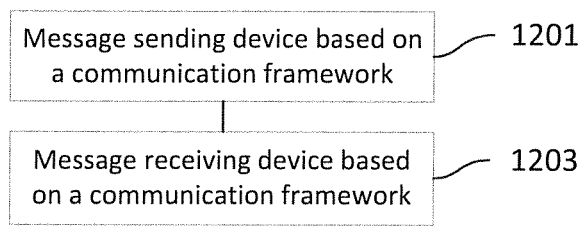
FIG. 12 illustrates a schematic diagram of a communication system, according to embodiments of the disclosure.

FIG. 12 illustrates a schematic diagram of the communication system according to the embodiments of the disclosure.

The communication system may include: a message sending device 1201 based on a communication framework (e.g., communication framework of FIG. 1) and a message receiving device 1203 based on a communication framework.

For example, message sending device 1201 based on a communication framework is configured for calling a transmission interface of a local transmission device after acquiring the data information; and sending the data information via the transmission interface to a transmission device of a demander demanding the data information. Message sending device 1201 can be the message sending device illustrated and described above in FIGS. 4 and 5.

Message receiving device 1203 based on a communication framework is configure for receiving, via a local transmission device, data information sent by a transmission device of a sender; clearing information of the sender carried in the data information after the data information is received by the transmission device; and reading, via the application program interface, the data information from which the information of the sender is cleared. Message receiving device 1203 can be the message receiving device illustrated and described above in FIGS. 10 and 11.

The message sending device 1201 based on a communication framework and the message receiving device 1203 based on a communication framework may both be implemented on a computer, but are not limited thereto. It could be any device that is capable of implementing the above methods. For example, the message sending device 1201 based on a communication framework and the message receiving device 1203 based on a communication framework may be implemented on a host machine or a virtual machine.

In a general configuration, a computing device may include one or more processors (CPU), an input/output interface (I/O), a network interface, and a memory.

The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage may be implemented with any method or technology. Information may be modules of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

Those skilled in the art should be appreciated that, embodiments of the disclosure may be provided as a method, a system and/or a computer program product. Therefore, the embodiments may be implemented in a form of hardware, software or a combination thereof. And, the embodiments may be in a form of a computer program product implemented on a computer readable storage medium containing computer readable program codes (including but not limited to a disk, a CD-ROM, an optical storage, and the like).

It will be appreciated that the present invention is not limited to the exact construction that has been described above and illustrated in the accompanying drawings, and that various modifications and changes may be made without departing from the scope thereof. It is intended that the scope of the invention should only be limited by the appended claims.

What is claimed is:

1. A communication interface framework, comprising a device layer, a core layer and a protocol layer, wherein
the device layer comprises:
    a transmission device for providing the framework with, when transmitting data information, a transmission interface for transmitting the data information, wherein the data information is acquired and transmitted in a form of a message;
the core layer comprises:
    an interface protocol to provide interfaces for different protocols used during calls for the protocol layer,
    a sending queue to store the data information be sent to other transmission devices, and
    a receiving queue to store the data information received from the other transmission devices; and
the protocol layer comprises:
    an interface processor to query, according to a message type of the message carrying the data information, the protocol corresponding to the message type during the calls for the protocol layer;
    a user mode application program interface for a system call to either push the data information to the sending queue or release the data information in the receiving queue, and
    a kernel mode application program interface for calls for a user process and kernel components to either push the data information to the sending queue or release the data information in the receiving queue;
wherein the communication interface framework is configured to:
    clear the sending queue stored in a current cache,
    push the data information to the sending queue corresponding to the protocol,
    transmit the sending queue, and
    detect a serial number of the data information in the sending queue.

2. The communication interface framework according to claim 1, wherein the core layer further comprises a scheduler to push the data information to the sending queue.

3. The communication interface framework according to claim 2, wherein the data information is transmitted and stored in a form of a message.

4. The communication interface framework according to claim 3, wherein the scheduler pushes, according to a message type of the message, the data information to a protocol queue corresponding to the message type.

5. A message sending method based on a communication interface framework, comprising:
    acquiring, via an application program interface of a protocol layer, data information to be sent, wherein the data information is acquired and transmitted in a form of a message;
    querying, according to a message type of the message carrying the data information, a protocol corresponding to the message type;
    clearing a sending queue stored in a current cache;
    pushing the data information to the sending queue corresponding to the queried protocol;
    calling a transmission interface of a local transmission device of a device layer after acquiring the data information asynchronously;
    sending the data information via the transmission interface to a transmission device of a demander demanding the data information;
    transmitting the sending queue; and
    detecting a serial number of the data information in the sending queue.

6. The method according to claim 5, wherein pushing the data information to a sending queue corresponding to the queried protocol further comprises
    pushing the data information to the sending queue corresponding to the protocol by callback function corresponding to the queried protocol.

7. The method according to claim 5, wherein, before a step of acquiring, via an application program interface, data information to be sent, the method further comprises:
    establishing a channel for transmitting the message carrying the data information.

8. The method according to claim 5, wherein calling a transmission interface of a local transmission device after acquiring the data information further comprises:
    calling the transmission interface of the local transmission device after acquiring the data information asynchronously.

9. The method according to claim 5, wherein, before a step of sending the data information via the transmission interface to a transmission device of a demander demanding the data information, the method further comprises:
activating the local transmission device.

10. A non-transitory computer readable medium that stores a set of instructions that is executable by at least one processor of a message sending device to cause the message sending device to perform a message sending method based on a communication interface framework, the method comprising:
acquiring, via an application program interface, data information to be sent, wherein the data information is acquired and transmitted in a form of a message;
querying, according to a message type of the message carrying the data information, a protocol corresponding to the message type;
clearing a sending queue stored in a current cache;
pushing the data information to the sending queue corresponding to the queried protocol;
calling a transmission interface of a local transmission device after acquiring the data information asynchronously;
sending the data information via the transmission interface to a transmission device of a demander demanding the data information;
transmitting the sending queue; and
detecting a serial number of the data information in the sending queue.

11. The non-transitory computer readable medium according to claim 10, wherein the set of instructions is executable by the at least one processor of the message sending device to cause the message sending device to further perform pushing the data information to a sending queue corresponding to the queried protocol by:
pushing the data information to the sending queue corresponding to the protocol by means of a callback function corresponding to the queried protocol.

12. The non-transitory computer readable medium according to claim 10, wherein before a step of acquiring, via an application program interface, data information to be sent, the set of instructions is executable by the at least one processor of the message sending device to cause the message sending device to further perform:
establishing a channel for transmitting the message carrying the data information.

13. A non-transitory computer readable medium that stores a set of instructions that is executable by at least one processor of a message receiving device to cause the message receiving device to perform a message receiving method based on a communication framework, the method comprising:
receiving, via a local transmission device, data information sent by a transmission device of a sender, wherein the data information is acquired and transmitted in a form of a message;
determining, according to a message type of the message carrying the data information, whether local interface protocols include a protocol corresponding to the message type;
reading a serial number in the data information in response to a determination that the local interface protocols include a protocol corresponding to the message type;
determining whether the data information is ordered;
releasing the data information in the receiving queue in response to a determination that the data information is not ordered;
clearing, after the local transmission device receives the data information, information of the sender carried in the data information; and
reading, via an application program interface, the data information from which the information of the sender is cleared.

* * * * *